United States Patent
Jones et al.

(10) Patent No.: US 10,955,238 B1
(45) Date of Patent: Mar. 23, 2021

(54) IN-PROCESS AUTOMATIC RECALIBRATION

(71) Applicant: KERR MACHINE CO., Sulphur, OK (US)

(72) Inventors: Joshua Philip Jones, Sulphur, OK (US); Mark Stephen Nowell, Ardmore, OK (US); Kelcy Jake Foster, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 1172 days.

(21) Appl. No.: 14/216,597

(22) Filed: Mar. 17, 2014

Related U.S. Application Data

(60) Provisional application No. 61/801,616, filed on Mar. 15, 2013.

(51) Int. Cl.
*G01B 21/04* (2006.01)
*G05B 19/401* (2006.01)
*G01B 5/008* (2006.01)

(52) U.S. Cl.
CPC .......... *G01B 21/045* (2013.01); *G01B 5/008* (2013.01); *G01B 21/04* (2013.01); *G01B 21/042* (2013.01); *G05B 19/401* (2013.01)

(58) Field of Classification Search
CPC ........................ G05B 19/401; G05B 19/4015
USPC .......................................................... 702/85
See application file for complete search history.

(56) References Cited

U.S. PATENT DOCUMENTS

| | | | | |
|---|---|---|---|---|
| 4,153,998 A | | 5/1979 | McMurtry | |
| 4,382,215 A | * | 5/1983 | Barlow | G05B 19/4015 318/568.1 |
| 4,899,094 A | * | 2/1990 | Pilborough | G05B 19/4015 318/567 |
| 4,982,504 A | * | 1/1991 | Soderberg | G01B 21/045 33/502 |
| 5,095,788 A | * | 3/1992 | Matoni | G05B 19/4015 700/192 |

(Continued)

OTHER PUBLICATIONS

M. Mori and et al, "Design optimization and development of CNC lathe headstock to minimize thermal deformation", CIRP Annals—Manufacturing Technology 58 (2009) 331-334, © 2009 CIRP, doi:10.1016/j.cirp.2009.03.033.*

(Continued)

*Primary Examiner* — Alexander Satanovsky
*Assistant Examiner* — Douglas Kay
(74) *Attorney, Agent, or Firm* — Tomlinson McKinstry, P.C.

(57) ABSTRACT

An apparatus and associated method for a frame that is configured to rotate a workpiece around an axis of rotation. The apparatus has a measurement device, and a known fixture that is supported by the frame. A processor is configured to execute stored computer instructions to initially-calibrate the measurement device to the axis of rotation, to employ the initially-calibrated measurement device to obtain an initial-calibration value of the known fixture, to store the initial-calibration value in a digital memory, to subsequently use the initially-calibrated measuring device to obtain an in-process automatic recalibration (IPAR) value of the known fixture, and to compare the IPAR value to the initial-calibration value to calculate a compensation value indicating positional error of the apparatus.

16 Claims, 13 Drawing Sheets

(56) References Cited

U.S. PATENT DOCUMENTS

| | | | | |
|---|---|---|---|---|
| 5,189,624 A * | 2/1993 | Barlow | G05B 19/182 | 700/169 |
| 5,439,431 A * | 8/1995 | Hessbruggen | B23Q 37/00 | 483/14 |
| 5,446,971 A * | 9/1995 | Neumann | G01B 5/0014 | 33/503 |
| 5,453,933 A | 9/1995 | Wright et al. | | |
| 5,771,950 A * | 6/1998 | Hardesty | B44B 1/006 | 144/135.2 |
| 5,815,400 A * | 9/1998 | Hirai | G05B 19/401 | 700/173 |
| 5,839,943 A * | 11/1998 | Stadtfeld | B23Q 17/2216 | 451/48 |
| 5,903,459 A * | 5/1999 | Greenwood | G05B 19/401 | 700/108 |
| 6,101,911 A * | 8/2000 | Newell | B23B 5/04 | 82/112 |
| 6,131,301 A * | 10/2000 | Sutherland | G01B 21/045 | 33/558 |
| 6,167,634 B1 * | 1/2001 | Pahk | B23Q 11/0007 | 33/503 |
| 6,225,771 B1 * | 5/2001 | Hammerle | G05B 19/401 | 318/568.22 |
| 6,434,846 B1 * | 8/2002 | McMurtry | B82Y 15/00 | 33/502 |
| 6,558,241 B2 * | 5/2003 | Hergott | A22C 11/0245 | 452/30 |
| 6,571,145 B1 * | 5/2003 | Matsumiya | G05B 19/41875 | 700/169 |
| 6,601,311 B2 * | 8/2003 | McMurtry | B82Y 15/00 | 33/502 |
| 6,668,466 B1 * | 12/2003 | Bieg | G01B 5/008 | 33/1 PT |
| 6,681,145 B1 * | 1/2004 | Greenwood | B25J 9/1692 | 700/176 |
| 6,819,974 B1 * | 11/2004 | Coleman | G05B 19/401 | 356/614 |
| 7,539,586 B2 * | 5/2009 | Goto | G01B 5/28 | 318/560 |
| 7,840,297 B1 * | 11/2010 | Tuszynski | G05B 13/048 | 700/108 |
| 8,250,952 B2 * | 8/2012 | Maxted | G05B 19/401 | 82/1.11 |
| 8,875,603 B2 * | 11/2014 | Maxted | G05B 19/401 | 82/1.11 |
| 2001/0048568 A1 * | 12/2001 | Ikeda | G11B 5/59633 | 360/59 |
| 2002/0042247 A1 * | 4/2002 | Hergott | A22C 11/0245 | 452/31 |
| 2002/0174555 A1 * | 11/2002 | McMurtry | B82Y 15/00 | 33/502 |
| 2003/0023380 A1 * | 1/2003 | Woloszyk | G01C 17/38 | 701/530 |
| 2003/0065419 A1 * | 4/2003 | Fujishima | B23Q 11/0003 | 700/176 |
| 2004/0139621 A1 * | 7/2004 | Lysen | G01B 21/24 | 33/412 |
| 2005/0000077 A1 * | 1/2005 | Dvoskin | G01B 5/12 | 29/407.08 |
| 2005/0043849 A1 * | 2/2005 | Coleman | G05B 19/401 | 700/195 |
| 2005/0242800 A1 * | 11/2005 | Heger | G01V 13/00 | 324/67 |
| 2006/0241873 A1 * | 10/2006 | Hsin | G03F 7/70766 | 702/41 |
| 2007/0260411 A1 * | 11/2007 | Goto | G01B 5/28 | 702/95 |
| 2007/0264096 A1 * | 11/2007 | Savoie | B24B 13/06 | 409/131 |
| 2007/0277357 A1 * | 12/2007 | Meyer | B24B 13/046 | 29/27 C |
| 2008/0287268 A1 * | 11/2008 | Hidler | A61H 3/008 | 482/69 |
| 2009/0183610 A1 * | 7/2009 | Maxted | G05B 19/401 | 82/1.11 |
| 2010/0299945 A1 * | 12/2010 | Lacy | G01B 5/0004 | 33/503 |
| 2011/0246132 A1 * | 10/2011 | Sato | B23Q 5/28 | 702/150 |
| 2012/0150354 A1 | 6/2012 | Rogers et al. | | |
| 2013/0139660 A1 * | 6/2013 | Maxted | G05B 19/401 | 82/1.11 |

OTHER PUBLICATIONS

Hass Automation "Lathe Operator's Manual 96-8700 Rev AP Dec. 2012", Hass Automation, Inc., 2800 Stugis Road, Oxnard, CA 93030, HaasCNC.com.*

J. S. Chen and et al, "Improving the Machine Accuracy Through Machine Tool Metrology and Error Correction", Int J Adv Manuf Technol (1996) 11:198-205 © 1996 Springer-Verlag London Limited.*

M. Ebrahimi and et al, "Analysis, modeling and simulation of stiffness in machine tool drives", Computers & Industrial Engineering 38 (2000) 93-105, © 2000 Elsevier Science Ltd.*

M. Fournier, "Attitude Determination and Control Hardware Development for Small Satellites", Masters of Applied Science Graduate Department of Aerospace Science and Engineering University of Toronto.*

* cited by examiner

| initial-calibration | $X_1$ | $X_2$ | $X_3$ | $COMP_{b,d}$ | PROFILE |
|---|---|---|---|---|---|
| n=1 | $X_{1\text{-}IPAR}$ | $X_{2\text{-}IPAR}$ | $X_{3\text{-}IPAR}$ | $COMP_{b,d\text{-}IPAR}$ | |
| n=2 | $X_{1\text{-}IPAR}$ | $X_{2\text{-}IPAR}$ | $X_{3\text{-}IPAR}$ | $COMP_{b,d\text{-}IPAR}$ | |
| n=3 | $X_{1\text{-}IPAR}$ | $X_{2\text{-}IPAR}$ | $X_{3\text{-}IPAR}$ | $COMP_{b,d\text{-}IPAR}$ | |
| ⋮ | | | | | |
| n | $X_{1\text{-}IPAR}$ | $X_{2\text{-}IPAR}$ | $X_{3\text{-}IPAR}$ | $COMP_{b,d\text{-}IPAR}$ | |

IN-PROCESS AUTOMATIC RECALIBRATION

RELATED APPLICATIONS

This application claims the benefit of the filing date of U.S. provisional application Ser. No. 61/801,616 filed on Mar. 15, 2013.

FIELD

The present embodiments relate generally to automated position controlling and more particularly, without limitation, to in-process automatic recalibration of a numeric-computer-controlled (CNC) machine tool.

BACKGROUND

The present technology relates to initial-calibration and in-process automatic recalibration of a CNC (computer numerical control) lathe using a touch trigger probe mounted on a tool-holding turret. The touch trigger probe can be used to capture data indicating x, y, and z coordinates of the probe while moving in a programmed path. The probe can be used for in-process part inspection and, in turn, for controlling the CNC lathe as a result of the inspections to compensate for position error.

The present technology resolves deficiencies in previously attempted solutions such as calibrating against the lathe chuck, calibrating against a surface machined in a work piece, or calibrating against a known reference dimension in the turret or mounted on an arm in the machine, because none of those previously attempted solutions automatically reference, compare, compensate and alert for inherent shifts or movements of the machine tool that can occur during machining. The previously attempted solutions provide a way to start out in a calibrated state, but do not enable the machine with the intelligence to automatically recalibrate in response to inherent variations in the CNC lathe.

A comparison to this phenomenon would be the trim function used in an airplane. A pilot trims the plane to fly on a specific path without climbing or descending. The trim will stay on this known path in perfect conditions. However, an airplane never flies in perfect conditions and the trim can get off because of variations such as passenger movement, change in wind patterns, decrease in weight because of fuel consumption or change in ambient temperature. The pilot has to recognize these changes and re-trim the plane to get back on the right path of travel. However, a plane equipped with autopilot can recognize deviation in the plane's line of travel and autocorrect the trim without the need of pilot intervention.

In the current machine art, a lathe operator would have to intervene and manually recalibrate the machine tool when calibration is lost. Positional error in a CNC lathe can cause the cutting tool to make a nonconforming part while the probe measures the nonconforming part as appearing to be conforming. The problem with this is that the previously attempted solutions require the operator's human judgment to detect if the CNC lathe is out of calibration, instead of equipping the machine with intelligence to ascertain position error and continuously compensate for the position error.

SUMMARY

Some embodiments of the present invention contemplate an apparatus having a frame that is configured to rotate a workpiece around an axis of rotation. The apparatus has a measurement device, and a known fixture that is supported by the frame. A processor is configured to execute stored computer instructions to initially-calibrate the measurement device to the axis of rotation, to employ the initially-calibrated measurement device to obtain an initial-calibration value of the known fixture, to store the initial-calibration value in a digital memory, to subsequently use the initially-calibrated measuring device to obtain an in-process automatic recalibration (IPAR) value of the known fixture, and to compare the IPAR value to the initial-calibration value to calculate a compensation value indicating positional error of the apparatus.

Some embodiments of the present invention contemplate a CNC lathe operably rotating a workpiece around an axis of rotation. The CNC lathe has a known fixture. A programmable tool holder is configured to selectively move a measurement device. A processor executes stored computer instructions to initially-calibrate the measurement device to the axis of rotation, to obtain an initial-calibration value of the known fixture via the initially-calibrated measurement device, to subsequently obtain an IPAR value of the known fixture via the initially-calibrated measurement device, to compare the IPAR value to the initial-calibration value to calculate a compensation value, and to select a different set of computer instructions in relation to the compensation value to alter a programmed path for a cutting tool in the tool holder.

Some embodiments of the present invention contemplate a method of in-process control of a CNC machine. The method includes: mounting a measurement probe for operable use by the CNC machine; initially-calibrating the probe to an axis of rotation of a known object; by employing the initially-calibrated measurement probe, obtaining an initial-calibration value of a known fixture that is separate and apart from the known object; storing the initial-calibration value to a digital memory; after the obtaining the initial-calibration value, manufacturing one or more workpieces via programmed operations of the CNC machine; after the manufacturing the one or more workpieces and by employing the initially-calibrated measurement probe, obtaining an IPAR value of the known fixture; and using the initial-calibration value and the IPAR value to automatically compensate for positional error of the CNC machine.

DETAILED DESCRIPTION

Initially, it is to be appreciated that this disclosure is by way of example only, not by limitation. The position controlling concepts disclosed herein are not limited to use or application with any specific system or method that employs the components as specifically arranged in the illustrative embodiments of the disclosure. That is, although the instrumentalities described herein are for the convenience of explanation, shown and described with respect to exemplary embodiments, it will be appreciated that the principles herein may be applied equally in other types of systems and methods. For example, without limitation, the in-process automatic recalibration technology disclosed herein by preferred embodiments can likewise be employed in technology other than a computer-numeric-controlled (CNC) machine.

The skilled artisan gains the knowledge from the disclosed preferred embodiments such that an enumeration of all possible applications of this technology is not necessary for the skilled artisan to readily ascertain the scope of the claimed technology. Similarly, the configurations of the known object and the known fixture in the disclosed embodiments for performing the claimed technology are merely illustrative of the contemplated embodiments and not in any way limiting of the claimed invention.

Figure 1:
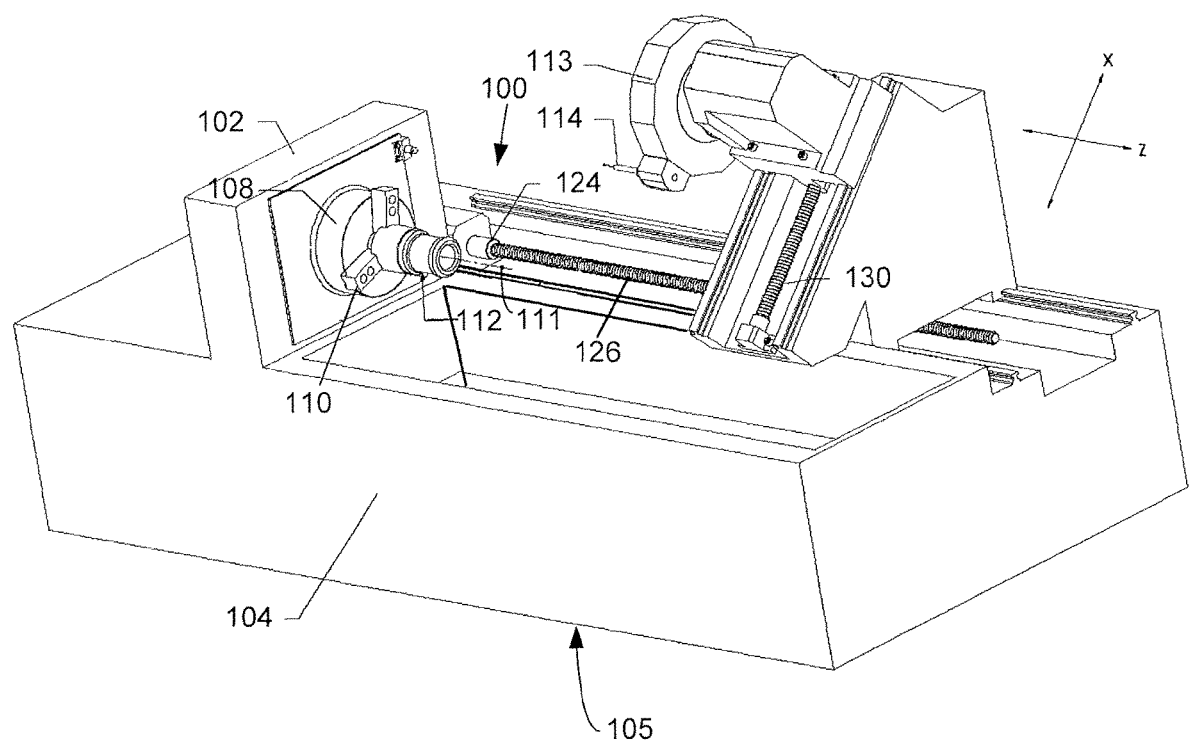
FIG. 1 diagrammatically depicts a CNC lathe that is constructed in accordance with illustrative embodiments of the present invention.

FIG. 1 diagrammatically depicts a CNC machine 100 that is constructed in accordance with illustrative embodiments of the present invention. Although these illustrative embodiments depict the claimed technology employed in a horizontal CNC lathe 100, the claimed technology is not so limited. The skilled artisan having read the disclosure of this description readily ascertains that the claimed technology can alternatively be employed in other types of CNC machines such as a CNC milling machine or a coordinate measuring machine and the like.

The CNC lathe 100 as depicted in FIG. 1 has a headstock 102 and a longitudinally extending bed 104, together forming a structural frame 105 supporting all the working components for the respective intended purposes. A spindle (not depicted) is journalled for rotation in the headstock 102. A chuck 108 is attached to a distal end of the spindle and is affixed in rotation with the spindle. The chuck 108 includes moveable jaws 110 that are openable to define a central cavity large enough to insert a workpiece 112. After inserting the workpiece 112, the jaws 110 are depicted in the closeable position, thereby frictionally engaging the outer surface of the workpiece 112 to selectively rotate the workpiece 112 in unison with the chuck 108 around an axis of rotation 111. The contemplated embodiments are not limited to these illustrative embodiments in which the chuck 108 grips against the outer surface of the workpiece 112. In alternative embodiments the chuck 108 can be configured to otherwise grip an inner surface, such as an inside diameter, or other workable surfaces.

The CNC lathe 100 has a turret 113 that is selectively moveable in order to perform various programmable quality control (PQC) operations to manufacture a finished product from the workpiece 112 with the CNC lathe 100.

Figure 2:
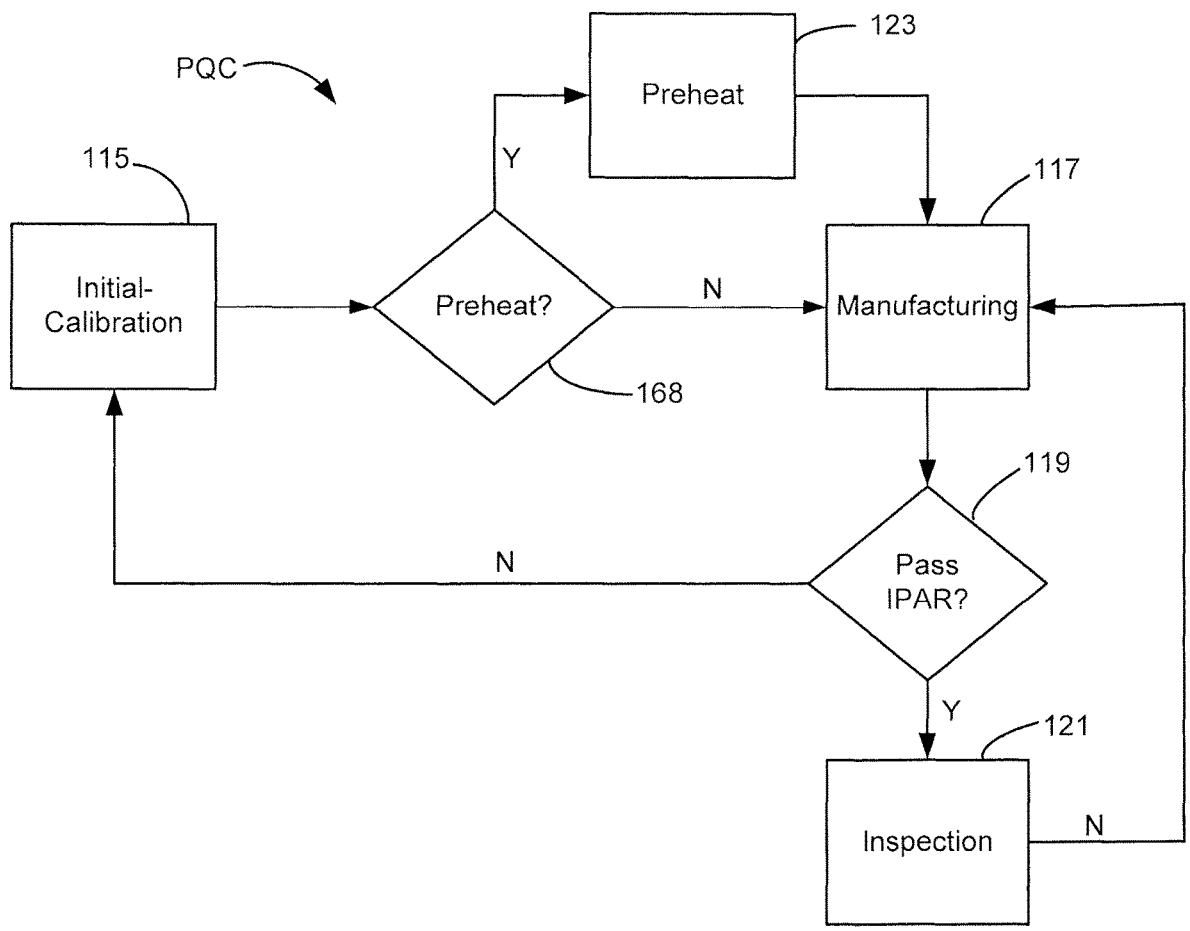
FIG. 2 is a functional block depiction of the programmable quality control (PQC) operations of the CNC lathe of FIG. 1.

FIG. 2 generally depicts the PQC operations of this technology as being broadly categorized into initial-calibration operations 115, manufacturing operations 117, in-process automatic recalibration (IPAR) operations 119, and inspection operations 121. Optional preheat operations 123 are selectively performed after the initial-calibration operations 115. The term "in-process" for purposes of this description and meaning of the appended claims, such as in the term "in-process automatic recalibration," is defined as all the operations of the PQC except for the initial-calibration operations 115. That is, the meaning of "in-process" operations includes the manufacturing operations 117, the IPAR operations 119, the inspection operations 121, and the preheat operations 123. Further, "in-process" operations include the operational transitions to and from each of the manufacturing operations 117, the IPAR operations 119, the inspection operations 121, and the preheat operations 123 as illustratively depicted by the arrows in FIG. 2.

However, FIG. 2 is illustrative and not limiting of the contemplated embodiments of this technology in that some or all of the IPAR operations 119 can be incorporated into other operations such as the manufacturing operations 117 or the inspection operations 121. Importantly, for purposes of this description and meaning of the claims the term "in-process" specifically excludes all of the initial-calibration operations 115. Importantly, that means this technology specifically contemplates the IPAR operations 119 are not part of the initial-calibration operations 115; the present technology particularly features performing repeated IPAR operations to compensate for position error instead of performing the initial-calibration operation again to compensate for that position error.

It will be noted that a plurality of workpieces 112 can be manufactured before transitioning to the IPAR operations 119. In some embodiments the plurality of workpieces 112 can be a predetermined number of workpieces 112. For example, the PQC operations can be programmed such that the IPAR operations 119 are performed for each workpiece 112, or every fifth workpiece 112, etc. Alternatively, the plurality of workpieces 112 can be quantified empirically during the in-process operations to maximize both quality and productivity. For example, if IPAR values (discussed below) in the IPAR operations 119 are consistently below some predetermined threshold then the PQC operations can be programmed to increase the number of workpieces 112 manufactured between each IPAR operation, unless and until the IPAR values trend differently.

The turret 113 (FIG. 1) is loaded with one or more cutting tools that are used in a programmed sequence and along respective programmed tool paths to perform the manufacturing operations 117. The turret 113 also contains at least one measurement probe 114 that is used to perform the inspection operations 121. The probe 114 can be a touch-trigger probe of the type sold by Renishaw® of Gloucestershire England.

In these illustrative embodiments the turret 113 is selectively positioned by a two-axis robotic configuration that moves the probe 114 longitudinally along the bed 104 in the z-axis directions by a servo motor 124 driving a ball screw 126, and laterally across the bed 104 in the x-axis directions by a servo motor 128 (FIG. 9) driving a ball screw 130. Positional control is performed by servo feedback from respective encoders, such as linear encoders and/or encoder motors, continuously sensing the coordinate position of the probe 114.

Figure 3:
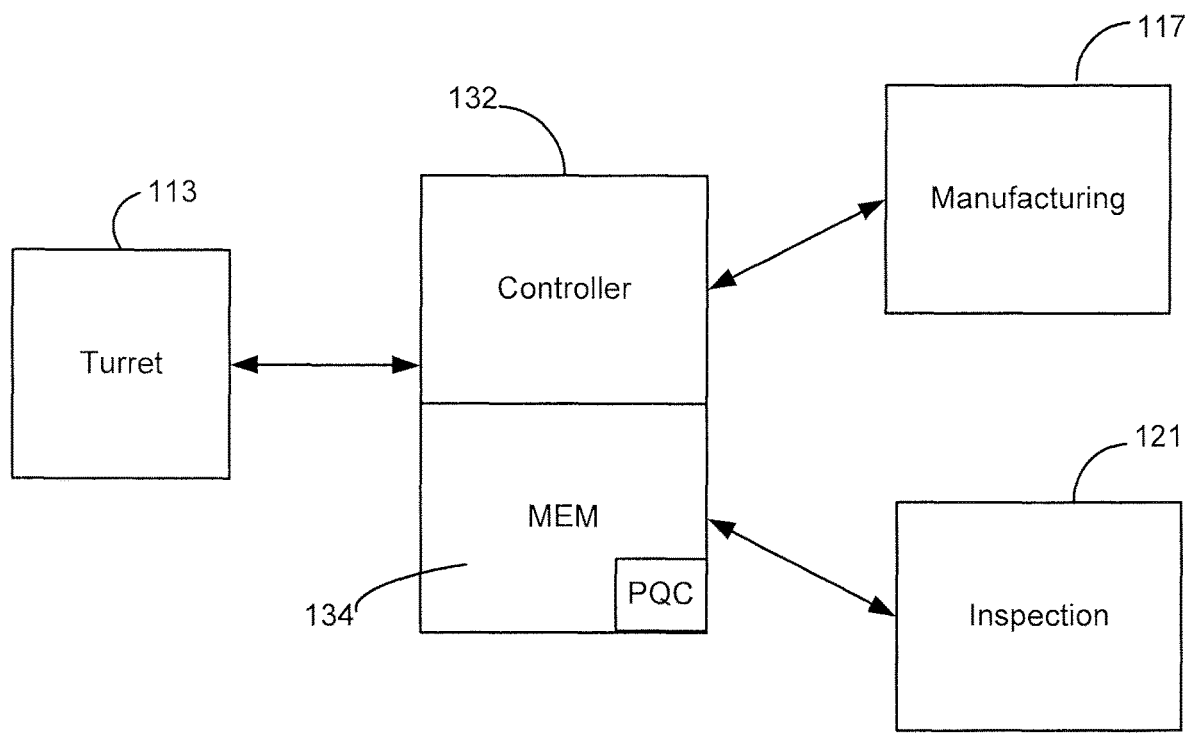
FIG. 3 is a functional block depiction of the control system of the CNC lathe of FIG. 1.

FIG. 3 depicts a functional block diagram of the control system for the CNC lathe 100. A processor-based controller ("processor") 132 executes computer instructions stored in a memory 134 to perform top-level control of all the PQC operations, as described herein. For purposes of this description and meaning of the claims, any disclosure that the processor 132 performs an operation means that the processor 132 is configured to execute computer instructions that are stored in the memory 134 in order to perform the operation as described. For example, the processor 132 responds to a programming call for a workpiece 112 inspection by indexing the turret 113 to make the probe 114 operable and selectively moveable to perform the programmed steps of the inspection operations 121 (FIG. 2).

Initial-Calibration

Figure 4:
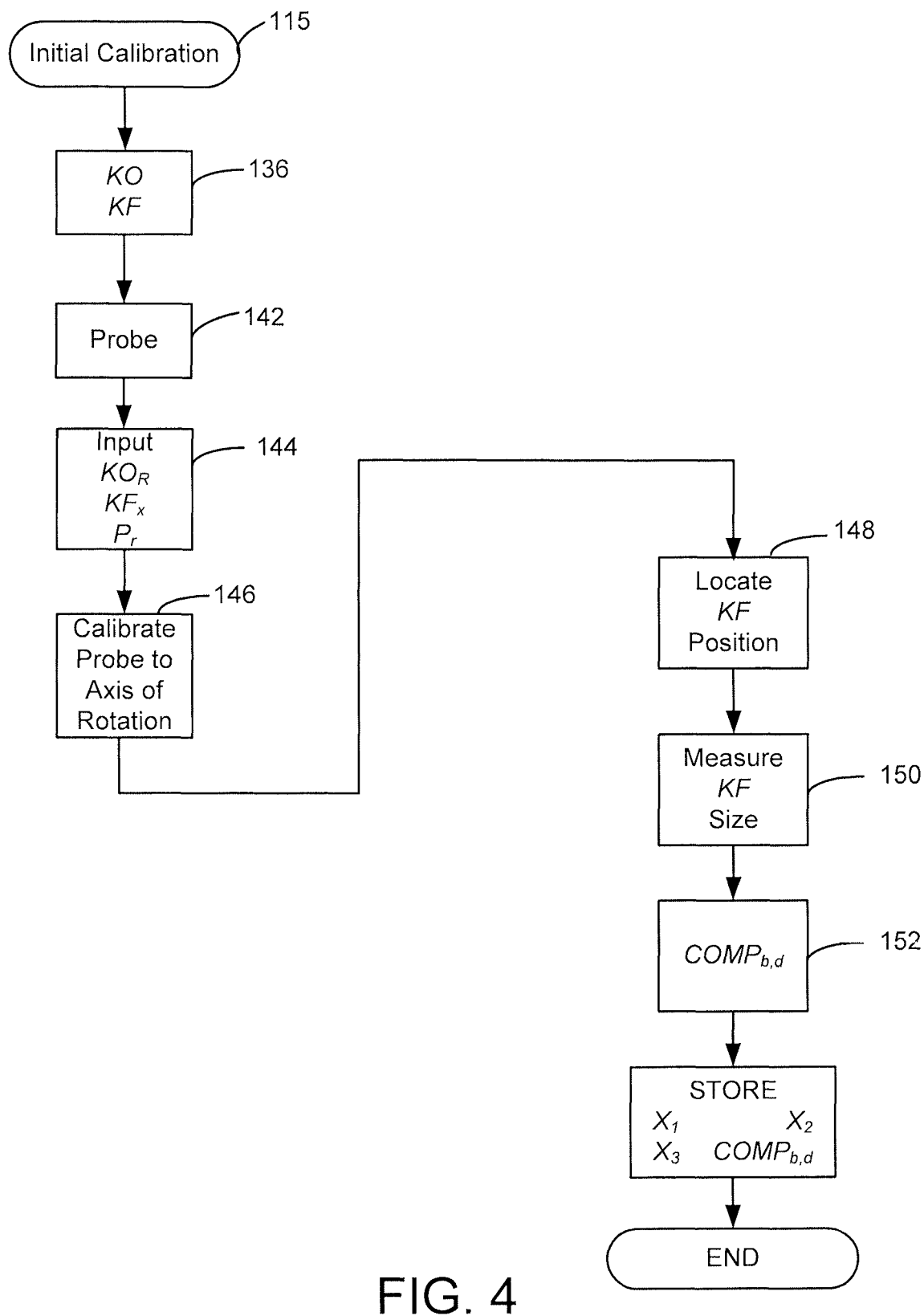
FIG. 4 is flowchart depicting steps in a method for INITIAL-CALIBRATION for operating the CNC lathe of FIG. 1.

The processor 132 executes the initial-calibration operations 115 (FIG. 2) to establish an initial, or baseline, set of location and size values that prepare the CNC lathe 100 to begin performing accurate in-process operations. FIG. 4 is a flowchart depicting illustrative steps in a method for INITIAL-CALIBRATION 115 in accordance with embodiments of this technology.

Figure 5:
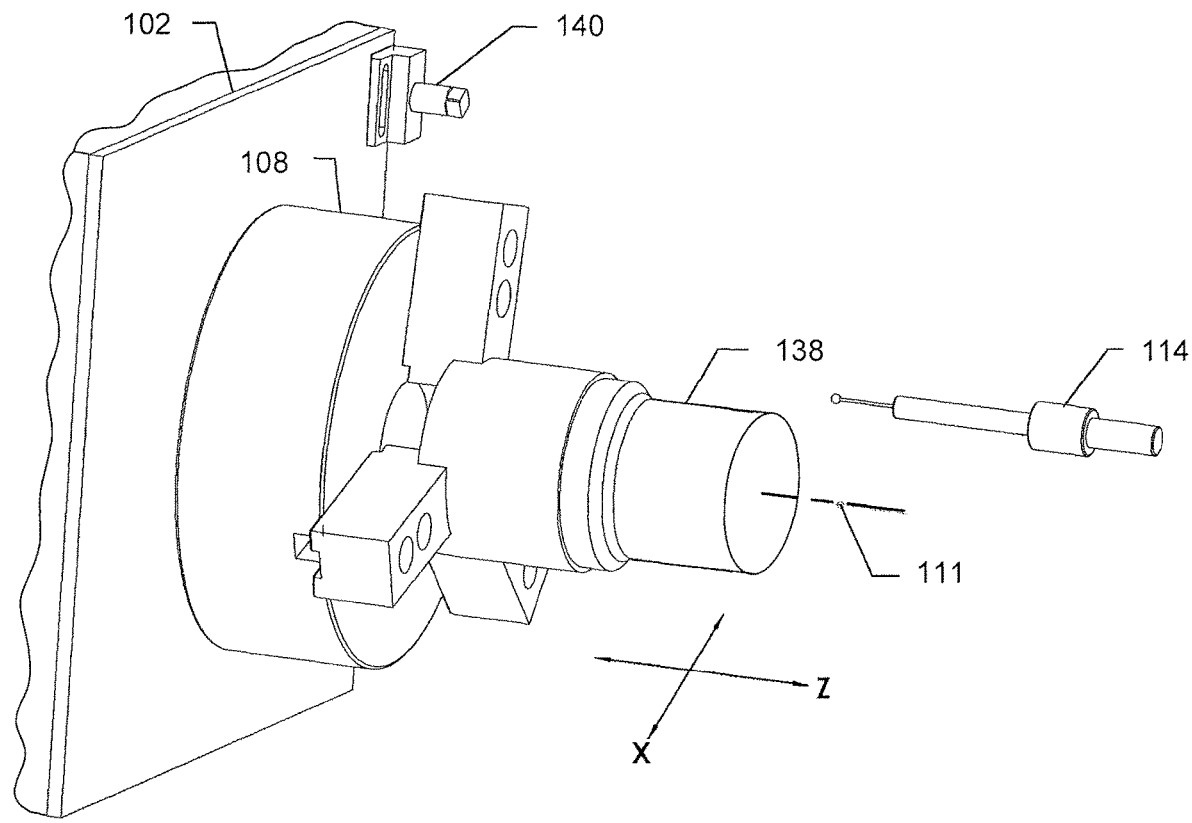
FIG. 5 is an enlarged isometric depiction of a portion of the CNC lathe of FIG. 1.

The initial-calibration method 115 begins in block 136 with obtaining a known object (KO) mounted in the chuck 108 and a known fixture (KF) attached to the CNC lathe 100. FIG. 5 is an enlarged isometric depiction of a portion of the CNC lathe 100 of FIG. 1 during the initial-calibration operation 115. A KO 138 having a known dimension such as a known radius ($KO_r$) is gripped in the chuck 108. For purposes of these illustrative embodiments the known dimension is an outside diameter of the KO 138, although the claimed technology is not so limited. In alternative embodiments other known dimensions can be employed such as an inside diameter or other known dimension.

Importantly, for accuracy the KO 138 must be made to rotate around the axis of rotation 1 of the chuck 108. That can be assured when using a pre-sized gage as the KO by first mounting the gage in the chuck 108 and then using a measurement device, such as a dial indicator, to verify that the outside diameter rotates concentrically. Alternatively, the KO can be made by turning (machining) an oversized bar stock to the known diameter with the CNC lathe 100.

Before the initial-calibration measurements begin, preferably the mechanical condition of the CNC machine 100, and particularly the robotic positioner, is checked to ensure all is within expectations. A routine maintenance checklist can include things like ensuring the proper cleanliness and lubrication exists, ensuring that no excessive backlash exists in the ball screw assemblies, ensuring all routine and predictive maintenance procedures have been done, and the like. Particularly, it is recommended that the machine tool be qualified for use by checking the backlash and center line. If backlash does exist then adjusting it out of any axis of the machine is recommended. By establishing the current backlash the probe 114 will later be able to detect and, if needed, compensate for backlash in the machine as the result of the IPAR operations of this technology.

FIG. 5 also depicts a known fixture (KF) 140 is attached to the headstock 102, separate and apart from the KO 138. In these depicted illustrative embodiments the KF 140 is a precisely constructed and dedicated fixture, although the contemplated embodiments are not so limited. In alternative embodiments something less precise than a dedicated fixture can be employed to practice this technology. A feature of the frame 105 itself that can be measured in the x-axis plane, such as a bolt head for example, can be used instead of a dedicated fixture as disclosed herein; although not with the same accuracy. For purposes of this description and meaning of the claims, the meaning of "known fixture" is that the device or feature selected as the KF can be measured by the probe 114 in the x-axis plane during the PQC operations.

In block 142 of the initial-calibration method 115 (FIG. 4), the processor 132 indexes the turret 113 to make the probe 114 operational. Previous care is essential to ensure the probe 114 was installed on center to ensure accurate measurements are obtained by the probe 114.

In block 144 of the initial-calibration method 115 the operator can use a graphical user interface to input known values for the actual radius (half the diameter) of the KO 138 ($KO_r$), the actual radius of the stylus of the probe 114 ($P_r$), and the x-axis width of the KF 140 ($KF_x$).

Figure 6:
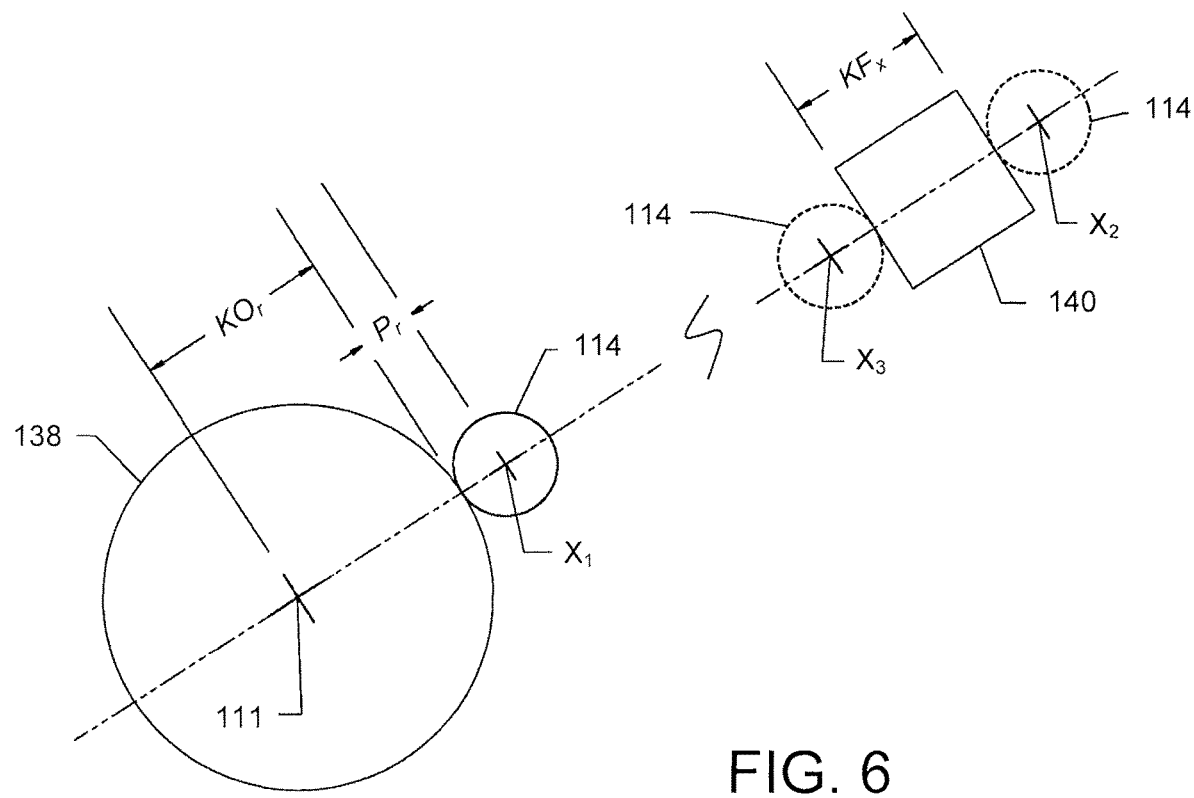
FIG. 6 diagrammatically depicts the CNC lathe of FIG. 1 during initial-calibration operations.

In block 146 of the initial-calibration method 115, and turning now also to FIG. 6, the processor 132 initially-calibrates the probe 114 to the axis of rotation 11 by moving the probe 114 along the x-axis plane until locating the x-coordinate value, $X_1$, of the known outside diameter of the KO 138. The processor 132 (FIG. 2) calculates the actual x-axis coordinate $X_1$ in terms of the equation:

$$X_1 = KO_r + P_r$$

where $KO_r$ is the known radius (as depicted) of the KO 138, and $P_r$ is the known radius (as depicted) of the stylus on the probe 114. The processor 132 zeros out any positional offset between the probe 114's $X_1$ reading (at contact) and the actual value of $X_1$ in order to initially-calibrate the probe 114 to the axis of rotation 111.

Beginning in block 148 of the initial-calibration method 115 (FIG. 4) the processor 132 employs the now initially-calibrated probe 114 to obtain one or more initial-calibration values of the KF 140. In these illustrative embodiments the processor 132 obtains initial-calibration values both in terms of location and size of the KF 140.

Figure 7:
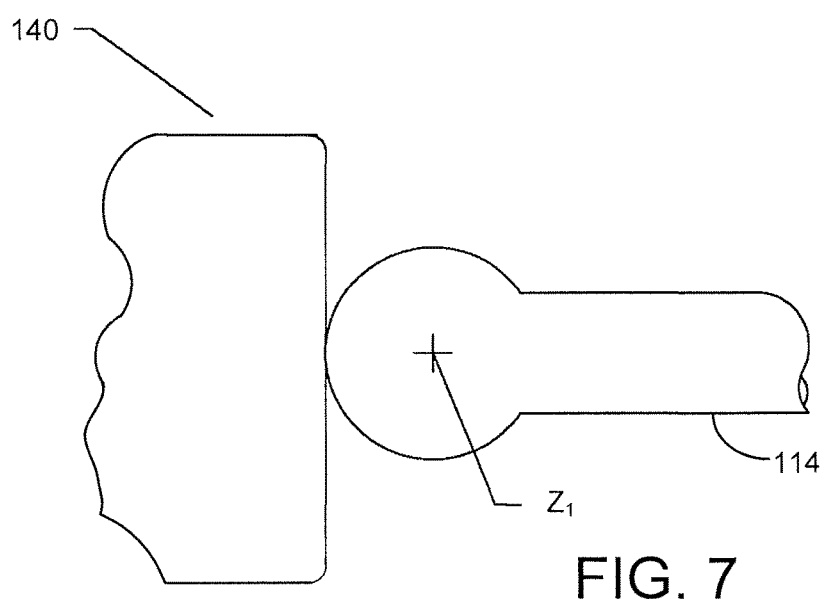
FIG. 7 diagrammatically depicts the CNC lathe of FIG. 1 during further initial-calibration operations.

Turning now to FIG. 7, the processor 132 first roughly positions the probe 114 adjacent the distal face of the KF 140, such as approximately at the x-axis center of the KF 140, and then locates the z-axis coordinate $Z_1$ of the distal face of the KF 140. $Z_1$ is thus an initial-calibration value in terms of a coordinate location of the KF 140.

In block 150 of the initial-calibration method 115 (FIG. 4), and returning to FIG. 6, the processor 132 proceeds to move the probe 114 along the z-axis and the x-axis directions to detect the coordinate locations where the probe 114 first contacts each of the opposing sides of the KF 140 that intersect the x-axis, denoted as probe 114 contact points $X_2$ and $X_3$. Note that although in these illustrative embodiments the opposing sides of the KF 140 are substantially orthogonal to the x-axis, this technology is not so limited to that being a requirement of the KF 140. In alternative embodiments, an existing machine feature can be used for the KF instead of a dedicated fixture as in these illustrative embodiments. In any event, $X_2$ and $X_3$ are additional initial-calibration values in terms of coordinate locations of the KF 140.

Note that the $X_2$ and $X_3$ initial-calibration values are obtained by moving the probe 114 in opposite x-axis directions until contacting the KF 140 on opposite sides. The x-axis distance between the $X_2$ and $X_3$ coordinates provides the probe 114's measurement of the known x-axis width $KF_x$ (as depicted) of the KF 140. The difference between the $X_2$ and $X_3$ coordinates is thus an initial-calibration value in terms of a size of the KF 140.

Note that the $X_2$ and $X_3$ coordinates are probed along the x-axis of travel, but traveling in opposite directions. Any uncorrected backlash in the respective direction of travel will adversely introduce position error into the measurements of the probe 114. Another source of position error is coordinate drift due to the operations of the processor 132. Because of the time it takes for the processor 132 to receive a signal from a probe 114 and cease the movement of the x-axis ball screw assembly, there is a shift between the actual coordinate value at the time the probe 114 makes contact and the coordinate value saved by the processor 132. This shift is affected by the feedrate of the probe 114 at the time contact is made. Because backlash and coordinate shift have the same effect on position error, they need not necessarily be distinguished so long as the sum is compensated for.

In block 152 of the initial-calibration method 115 (FIG. 4) the processor 132 calculates a compensation value that corrects for backlash in the x-axis ball screw assembly and for processor coordinate drift ($COMP_{b,d}$) in terms of the following equation:

$$COMP_{b,d} = KF_x - ((X_2 - P_r) - (X_3 + P_r))$$

The processor 132 stores the initial-calibration values and exits the initial-calibration operations 115 to begin extended in-process operations.

In-Process Automatic Recalibration (IPAR)

Figure 8:
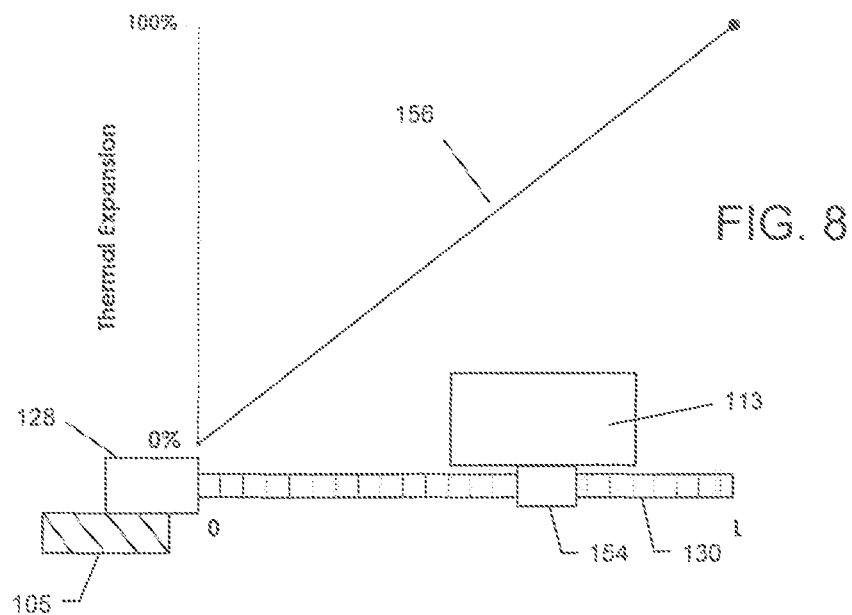
FIG. 8 graphically depicts a linear approximation profile for the thermal expansion of the ball screw assembly in the CNC lathe of FIG. 1.

Another source of positional error is the result of thermal growth of the ball screw assemblies during operation of the CNC lathe 100. FIG. 8 diagrammatically depicts how the turret 113 is supported and selectively moved laterally upon a ball nut 154 that directly contacts and threadingly engages the x-axis ball screw 130. The frictional engagement between the ball nut 154 and the ball screw 130, during the repeated movements of the ball nut 154 along the ball screw 130, result in a heating of the ball screw assembly, creating thermal expansion of the ball screw assembly. The ball screw 130 is selectively rotated by the motor 128 that is, in turn, rigidly attached to the frame 105. Because the proximal end of the ball screw 130, denoted at length "0," is constrained by the attachment of the motor 128 to the frame 105, heating the ball screw assembly creates comparatively less thermal expansion at the proximal end 0. On the other hand, the distal end of the ball screw assembly, denoted at length "L" and typically supported by a bearing (not depicted), is displaced by comparatively more thermal expansion. The thermal expansions of medial portions of the ball screw assembly vary in relation to longitudinal location. The plotted line 156 (PROFILE) is a linear approximation of that relationship defining minimal thermal expansion occurring at the proximal end 0 of the ball screw assembly, and maximum thermal expansion occurring at the distal end L of the ball screw assembly. The PQC operations depicted in FIG. 2 include a determination in block 168 (FIG. 2) whether to perform the preheat operations 123 on the ball screw assembly. If the determination of block 168 is "no," then the processor 132 selects a stored approximation PROFILE such as PROFILE 156. The number and types of stored approximation PROFILES is not limited to the illustrative example of the linear PROFILE 156. In alternative embodiments one or more approximation PROFILES, linear and/or curvilinear, can be stored and recalled for use by the processor 132 for this IPAR technology.

Figure 9:
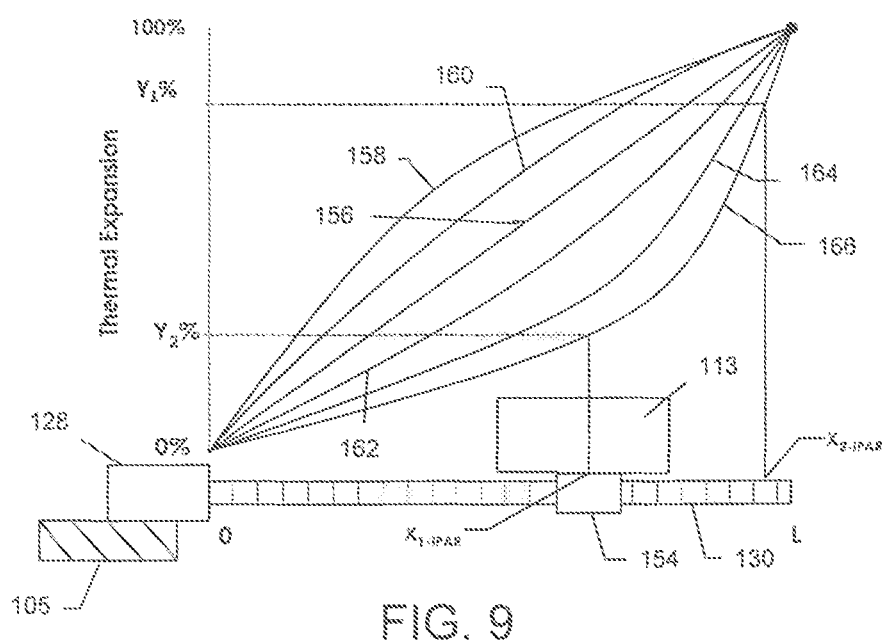
FIG. 9 is similar to FIG. 8 but also depicts a number of empirically-derived curvilinear profiles.

FIG. 9 is similar to FIG. 8 except that a number of PROFILES 158-166 have been empirically obtained and stored in addition to the PROFILE 156 discussed previously. The curvilinear PROFILES 158-166 more accurately reflect the fact that the rate of thermal expansion more likely varies at different medial locations of the ball screw assembly, as opposed to the constant rate at all medial locations in the linear approximation PROFILE 156. The different empirically-derived PROFILES 158-166 can be the result of employing different exercise routines during the preheat operations 123 (FIG. 2), or the result of employing an exercise routine in different environmental conditions, or the result of a mixture of both. The different PROFILES 158-166 can also include empirically-derived PROFILES from other lathes, forming a cross-machine library of a multitude of potential PROFILES from which to pick. With such a library of empirically-derived PROFILES, the processor 132 can perform the preheating operation 123 to obtain the changes in length at selected medial locations, and then curve-fit the data to the closest PROFILE stored in the library. Preferably, the processor 132 can curve-fit to the closest already stored PROFILE within a predetermined curve-fit error, and if not then the processor 132 can construct a new PROFILE for the latest preheating routine and store the newly derived PROFILE in the library.

Figure 10:
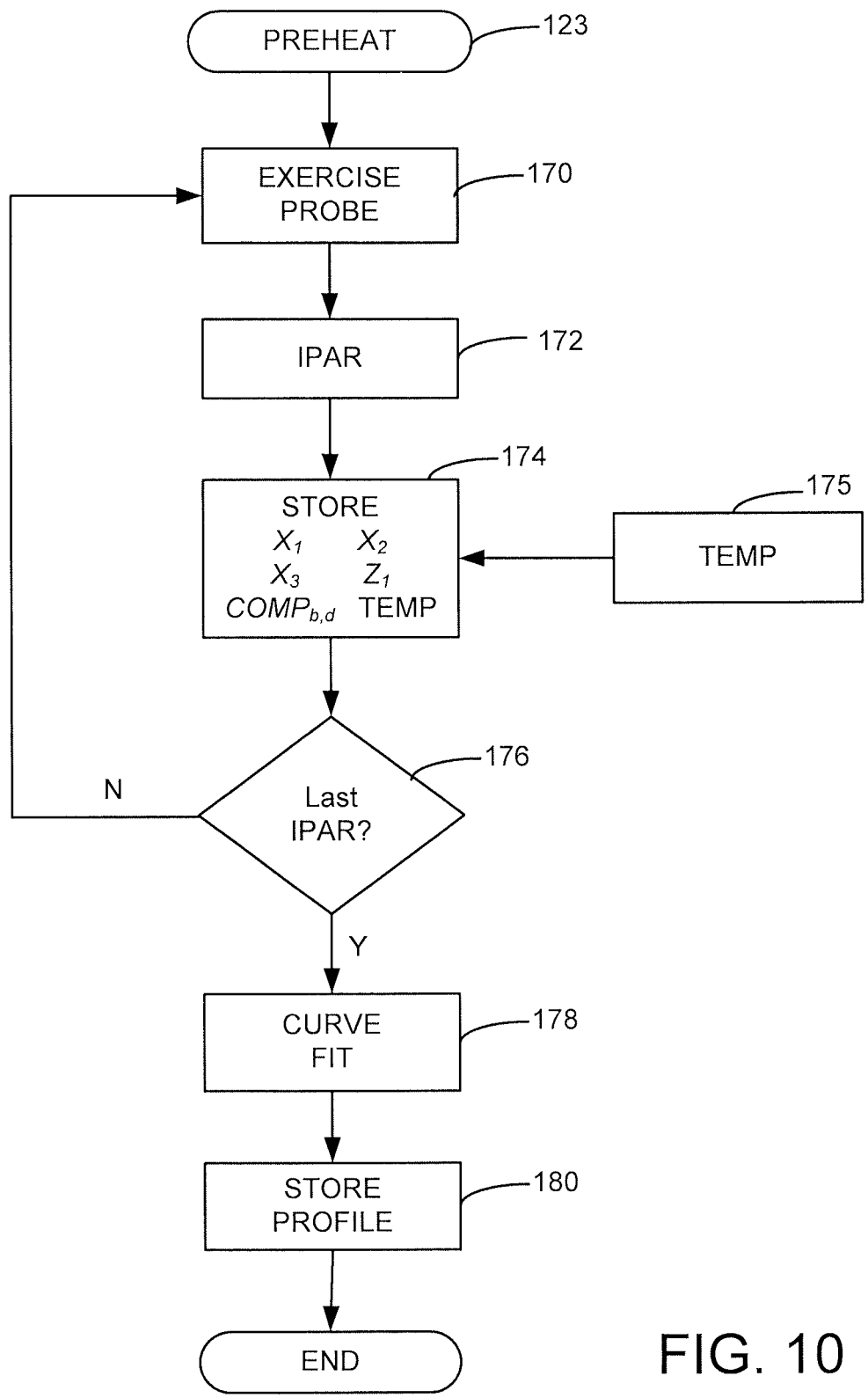
FIG. 10 is a flowchart depicting steps in a method for PREHEAT in accordance with embodiments of this technology.

Referring again to FIG. 2, if the determination of block 168 is "yes," then the processor 132 performs the preheat operations 123 in order to heat the ball screw assembly to operating temperature so that the selected PROFILE best characterizes the CNC lathe 100 at operating conditions. FIG. 10 is a flowchart depicting steps in a method for performing the preheat operations 123 in accordance with illustrative embodiments of this technology.

The method 123 begins in block 170 by the processor 132 exercising the ball screw assembly by selectively reciprocating the ball nut 154 along the ball screw 130 according to a predetermined or empirically derived exercise routine. The exercise routine can move the ball screw assembly back and forth the entire length or incrementally. Preferably, the exercise routine can approximate repeated movements similar to what the CNC lathe 100 makes during manufacturing operations 117 and inspection operations 121. A predetermined or varying dwell time between each set of movements can be employed to ensure a uniform distribution of the thermal excitation. The exercise routine can also be modified parametrically such as for environmental conditions.

After a predetermined portion of the exercise routine, control passes to block 172 where the processor 132 performs the IPAR operations 119 and stores the IPAR values in memory in block 174. Importantly, some CNC lathes have the capability of measuring the ball screw assembly temperature. Otherwise, any CNC lathe can be modified to supply the ball screw assembly temperature in block 175. The processor 132 in block 174 can store the ball screw assembly temperature at the time each set of IPAR values is collected and stored. The processor 132 can use that data to compare the rate of thermal expansion to the rate of temperature change during the preheat operation 123. For example, it might be determined that the current preheat operations 123 imparted 0.0004" of thermal expansion per °

F. of temperature increase over some portion of the ball screw assembly. That rate can be stored with each PROFILE and continuously monitored as another IPAR parameter for measuring the occurrence of position error.

In block 176 the processor 132 determines whether the cycle-to-cycle variations in the IPAR values are sufficiently reduced to indicate that a steady-state thermal condition has been achieved. If the determination of block 176 is "no," then control passes to block 170 and the method performs another exercise routine and IPAR. If the determination of block 176 is "yes," then control passes to block 178 where the processor 132 curve-fits the data as discussed above to select the best PROFILE for use by the IPAR operations 119. The selected PROFILE is stored to memory (see FIG. 15) in block 180.

After storing the selected PROFILE, the processor 132 transitions to production activities in the manufacturing operations 117, IPAR operations 119, and inspection operations 121. Recall that the initial-calibration operations 115 were performed to positionally calibrate the probe 114 to the axis of rotation 111, and to initially-calibrate the KF 140 both in terms of coordinate location and in terms of size. However, during in-process operations variation can significantly alter the CNC lathe 100 with respect to that initial-calibration 115. For example, positional error can be the result of displacement of the axis of rotation 111 as the environmental conditions change. Also, positional error can be the result of changing machine conditions such as variation in the ball screw backlash, which can vary according to temperature change, by normal wear, and by a sudden mechanical shift.

In previously attempted solutions it is entirely the human operator's responsibility to determine when enough positional error is occurring to warrant performing the initial-calibration procedure 115 over again. That is problematic because it is a constant struggle to retain adequately skilled and disciplined machine operators who can manage that obligation successfully, often resulting in producing out of tolerance parts before it is discovered that the CNC lathe 100 is in need of performing the initial-calibration operation 115 over again. The present technology, by way of the IPAR operations 119, resolves that inherent deficiency of the previously attempted solutions by automatically keeping the CNC lathe 100 in a constant and continuous state of recalibration, eliminating dependence on an operator's judgment. IPAR continuously compensates with tool offsets for measured position error, so that the only conceivable reason for performing the initial-calibration operations 115 again would be the result of some catastrophic shift. When the IPAR operations 119 determine the initial-calibration operation 115 needs to be performed over again, the IPAR operations 119 automatically lock out the CNC lathe 100 to any further in-process operations until the initial-calibration operation 115 is performed again.

Figure 11:
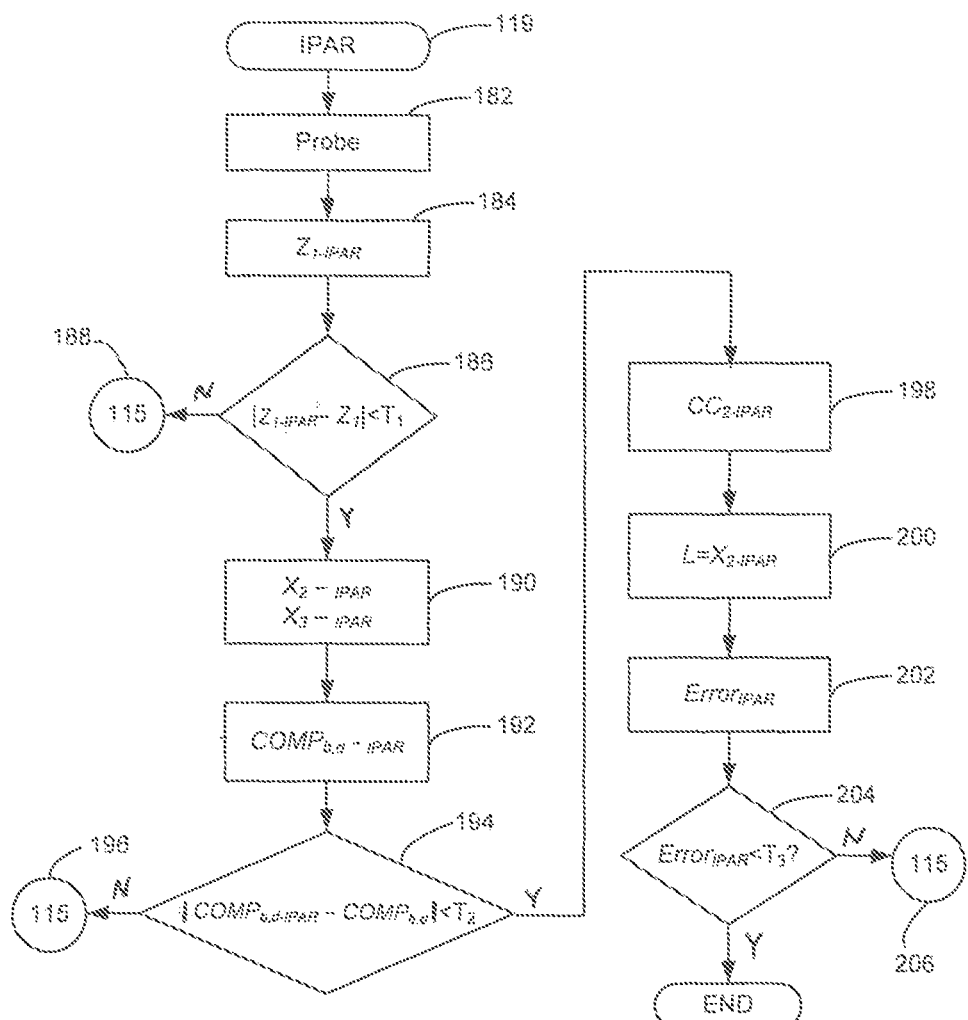
FIG. 11 is a flowchart depicting steps in a method for IPAR in accordance with embodiments of this technology.

FIG. 11 is a flowchart depicting steps in a method for IPAR operations 119 in accordance with embodiments of this technology. The method 119 begins in block 182, as further depicted in FIG. 12, with the processor 132 indexing the turret 113 to make the probe 114 operational, and then in block 184 employing the probe 114 to determine the coordinate location of the distal face of the KF 140 during the IPAR operation 119, similar to the $Z_1$ determination in FIG. 7 but now in the IPAR operations 119 denoted as $Z_{1\text{-}IPAR}$. The $Z_{1\text{-}IPAR}$ is referred to as an IPAR value of the KF 140 in terms of a coordinate location. In block 186 (FIG. 10) the processor 132 compares a predetermined threshold value, $\text{Threshold}_{Z\ Location}$, to the difference between this current in-process value of the KF 140 and the previously stored initial-calibration value of the KF 140, such as in terms of the following rule:

$$\text{Threshold}_{Z\ Location} > |Z_{1\text{-}IPAR} - Z_1|$$

If the absolute value of the difference between the initial-calibration value and the IPAR value is not less than $\text{Threshold}_{Z\ location}$, then the processor 132 transfers control to block 188 to automatically cease the in-process operations and alarm the operator, and perhaps management, that the CNC lathe 100 must be initially-calibrated again before in-process operations can continue. A need for another initial-calibration operation 115 at this juncture is likely the result of a catastrophic positional shift, such as by either the turret 113, the probe 114, or both.

Figure 13:
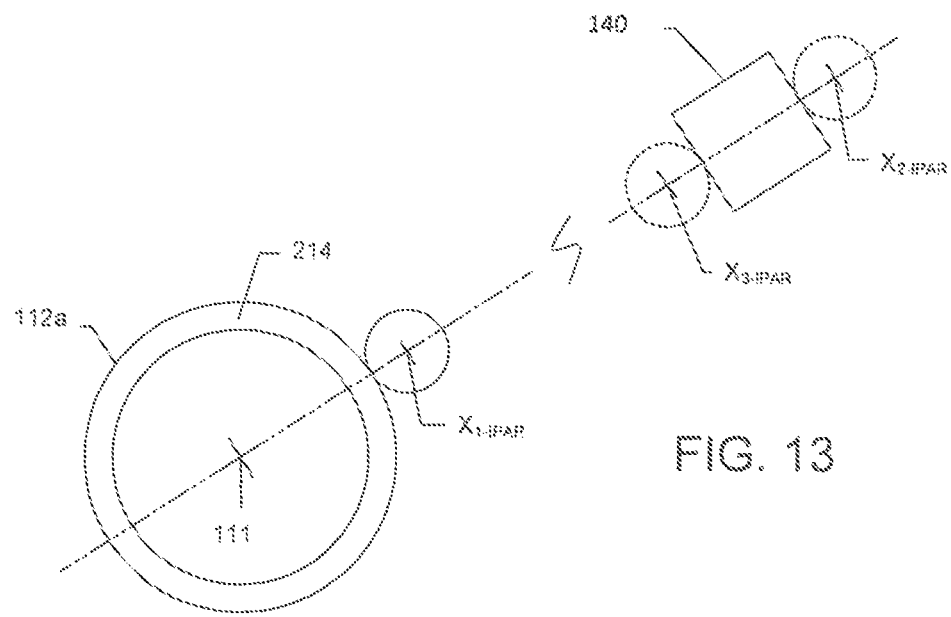
FIG. 13 diagrammatically depicts the CNC lathe of FIG. 1 during IPAR and inspection operations of this technology.

Still referring to FIG. 11 and now also FIG. 13, after successfully determining that the difference between $Z_{1\text{-}IPAR}$ and $Z_1$ is less than $\text{Threshold}_{Z\ location}$, in block 190 the processor 132 then proceeds to obtain IPAR values for the coordinates of the opposing sides of the KF 140, denoted $X_{2\text{-}IPAR}$ and $X_{3\text{-}IPAR}$. In block 192 the processor 132 calculates an IPAR value for the positional error due to backlash and coordinate drift in terms of the following equation:

$$\text{COMP}_{b,d\text{-}IPAR} = \text{KF}_x - ((X_{2\text{-}IPAR} - P) - (X_{3\text{-}IPAR} + P_r))$$

In block 194 the processor 132 compares a predetermined threshold value, $\text{Threshold}_{Size}$, to the difference between this current in-process value of the KF 140 and the previously stored initial-calibration value of the KF 140, such as in terms of the following rule:

$$\text{Threshold}_{Size} > |\text{COMP}_{b,d\text{-}IPAR} - \text{COMP}_{b,d}|$$

If the difference exceeds the $\text{Threshold}_{Size}$ then in block 196 the processor 132 can invoke corrective actions, such as automatically ceasing the in-process operations and alarming the operator, and perhaps management, that the CNC lathe 100 must be initially-calibrated again before in-process operations can continue. A nonconforming measurement is likely an indication that positional error has been introduced, such as increased backlash or coordinate drift and the like.

Although not depicted in FIG. 11, in alternative embodiments another threshold check can be made by comparing the rate of thermal expansion to the rate of thermal increase, and comparing the current rate to the stored rate in the PROFILE, as discussed above in regard to block 175 in FIG. 10.

The IPAR values, in terms of location and size, provide a quantified machine condition of the CNC lathe 100. Preferably the IPAR values are stored to memory and routinely checked for any trending tendencies that can advantageously trigger preventive actions by the processor 132 to increase both product quality and production throughput.

With the CNC lathe 100 deemed to be in good machine condition, in block 198 the processor 132 then proceeds to compute a currently ascertainable coordinate change value, $CC_{2\text{-}IPAR}$, by comparing the current in-process coordinate value of the KF 140 to the previously stored initial-calibration coordinate value of the KF 140 in terms of the following equation:

$$CC_{2\text{-}IPAR} = X_{2\text{-}IPAR} - X_2$$

In block 200 the processor 132 indexes the stored PROFILE (FIG. 9) for $L = X_{2\text{-}IPAR}$, the currently measured location of the KF 140. Assuming for this example that the PROFILE 166 is currently stored in memory from a previous preheat operation 123, then the $X_{2\text{-}IPAR}$ location of the ball screw 130 corresponds by the PROFILE 166 to $Y_1\%$ of the total amount of thermal expansion. In block 202 (FIG. 11) the processor 132 calculates the IPAR positional error, $Error_{IPAR}$, in terms of the following equation:

$$Error_{IPAR} = \frac{CC_{2-IPAR}}{Y_1\%}$$

In block 204 (FIG. 11) the processor 132 compares a predetermined threshold, $Threshold_{IPAR}$, to the $Error_{IPAR}$ in terms of the following rule:

$Threshold_{IPAR} > Error_{IPAR}$

If $Error_{IPAR}$ exceeds the $Threshold_{IPAR}$ then in block 206 the processor 132 can invoke corrective actions, such as automatically ceasing the in-process operations and alarming the operator, and perhaps management, that the CNC lathe 100 must be initially-calibrated again before in-process operations can continue. A nonconforming measurement is indicative of more positional error than expected, either in measuring error or in turret 113 positioning error, or both.

Inspection Operations

Figure 12:
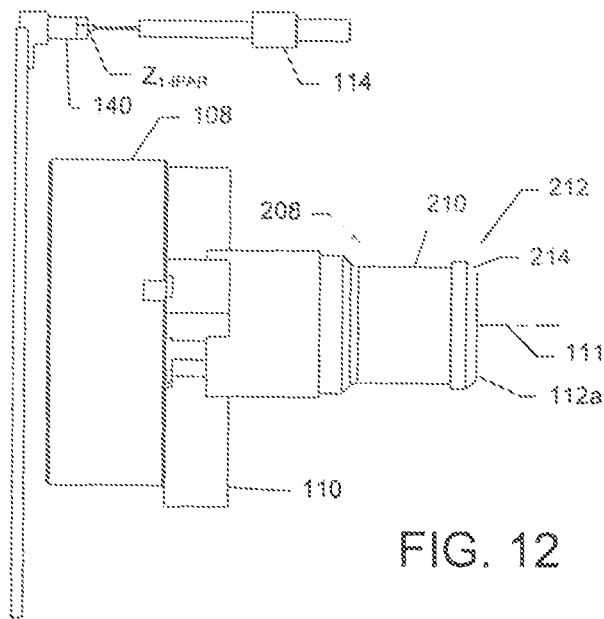
FIG. 12 diagrammatically depicts the CNC lathe of FIG. 1 during IPAR operations of this technology.

FIG. 12 depicts an in-process workpiece 112a at a time after the CNC lathe 100 has performed a machining operation to produce a cylindrical portion 208 having a machined outside diameter surface 210, and a distal flange portion 212 having a machined taper surface 214. For purposes of these illustrative embodiments the surface 214 is machined to be concentric to the axis of rotation 111. Although in this simplified example the in-process inspection operations 121 (FIG. 2) check only one point on the machined taper surface 214, the skilled artisan recognizes that the disclosure of this specification can likewise be applied to as many points on the machined surfaces as desirable to perform the necessary PQC. For example, it would be advantageous to check the machined taper surface 214 at two or more different z-axis coordinates in order to calculate the slope and flatness of the machined taper surface 214. Although in these illustrative embodiments the workpiece 112a is not spinning during the inspection operations 121, the contemplated technology is not so limited. For example, in alternative embodiments the workpiece 112a can be rotationally positioned for a first inspection and then rotated for one or more other inspections. Each of those inspections can be performed while the chuck 108 is still spinning or stopped.

Figure 14:
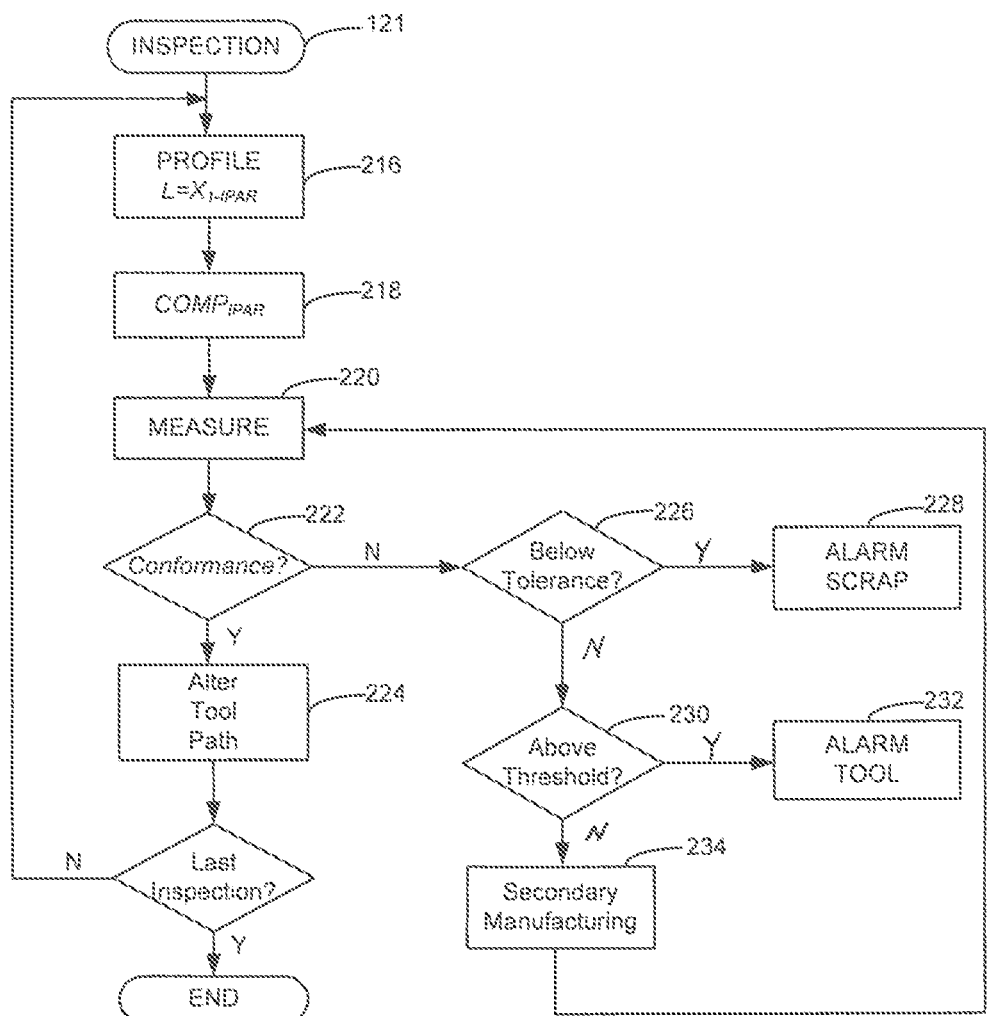
FIG. 14 is a flowchart depicting steps in a method for INSPECTION in accordance with embodiments of the present technology.

Now referring to FIG. 14 which is a flowchart depicting steps in a method for INSPECTION of the in-process workpiece 112a in accordance with this technology. The method 121 begins in block 216 with the processor 132 indexing the stored PROFILE 166 (to continue the example started above, FIG. 9) according to $L=X_{1-IPAR}$(FIG. 13), the actual x-axis coordinate of the taper surface 214 being inspected (at a specified z-axis coordinate). FIG. 9 diagrammatically depicts the ball screw 130 contactingly supporting the ball nut 154 (and in turn locally supporting the probe 114 in the turret 113) when the probe 114 is employed to operably measure the taper surface 214 of the workpiece 112a. The $X_{1-IPAR}$ location of the ball screw assembly corresponds by the PROFILE 166 to a $Y_2\%$ of the total thermal expansion. In block 218 the processor 132 can then calculate an IPAR compensation value, $COMP_{IPAR}$, for positional error when measuring the taper surface 214, in terms of the following equation:

$COMP_{IPAR}=Error_{IPAR}*Y_2\%$

The processor 132 can then calculate an adjusted nominal dimension, $NOM_{ADJ}$, that offsets the specified nominal dimension, $NOM_{SPEC}$, in view of the total positional error for measurements at the workpiece 112a, in terms of the following equation:

$NOM_{ADJ}=NOM_{SPEC}+COMP_{IPAR}$

In block 220 the inspection operations 121 measure the workpiece 12a feature, here the taper surface 214, and compares the measurement value to a range of conforming values defined in terms of the following equation:

Conformance=$NOM_{ADJ}\pm$Specified Tolerance

In block 222 the processor 132 makes the determination whether the measurement obtained in block 220 is within the Conformance range. If the determination is "yes," then in block 224 the processor 132 modifies the programmed tool path for the tool that cut the taper surface 214, so that for the next workpiece 112a the tool will be programmed to cut to the $NOM_{ADJ}$ dimension.

For clarity, assume for purposes of an illustrative example the workpiece 112a is specified to have an outside diameter of 2.000 inches, and a tolerance of +0.002 inches. Assume for simplicity sake the processor 132 has calculated the current $COMP_{IPAR}$ value as being −0.001 inches. Therefore, this IPAR technology determines that because of the current positional error, an expected X1 coordinate location for this 2.000 inch nominal dimension will actually be measured by the probe 114 at 1.999 inches. The processor 132 thereby compensates for positional error by temporarily (for this inspection) setting the Conformance value as being 1.999±0.002 inches. Even if the probe 114 measurement value is within the Conformance range, the processor 132 alters the tool path for the next workpiece 112a to cut to 1.999 inches, and in this way continuously compensates the nominal value for the current position error.

Importantly, this provides the ongoing automatic position error compensation of the IPAR operations of this technology. Here, knowing the taper surface 214 is reprogrammed to pass through the $NOM_{ADJ}$ dimension at the corresponding z-axis coordinate and at a specified angle, the processor 132 can thereby modify the programmed tool path for cutting the entire taper surface 214 in the next workpiece 112a at the specified angle and including the $NOM_{ADJ}$ dimension.

On the other hand, if the determination of block 222 is "no," then in block 226 the processor 132 determines whether the measurement obtained in block 220 is less than the minimum range of the Specified Tolerance, rooted at the $NOM_{ADJ}$ dimension. If the determination of block 226 is "yes" then it means too much material has been cut from the workpiece 112a, so the processor 132 passes control to block 228 which ceases the in-processes operations and alarms the operator and preferably management as well of the likelihood that a scrap workpiece 112a has been made. The likelihood that costly scrap has been produced makes it advantageous to alarm management, and perhaps lock the operator out until the processor 132 receives an acknowledgement that management has intervened—such as requiring the input of a supervisor's password to continue further in-process operations of the CNC lathe 100.

If the determination of block 226 is "no," then in block 230 the processor 132 determines whether the measurement obtained in block 220 is greater than a predetermined tool damage threshold, $Threshold_{tool\ damage}$, which is preferably a value that is slightly greater than the maximum range of the Specified Tolerance, rooted at the $NOM_{ADJ}$ dimension. If the determination of block 230 is "yes" then it means not enough material has been cut from the workpiece 112a. As it will be appreciated from a full understanding of this technology, the IPAR operations compensate for position error by continuously altering the tool path to cut to the $NOM_{ADJ}$. A determination of "yes" in block 230 is thereby an indication that an abrupt shift has occurred since the last IPAR. In view of that, the processor 132 passes control to block 232 which ceases the in-processes operations and alarms the operator, and perhaps management, of the likelihood that catastrophic tool damage has occurred since the last workpiece 112a. The processor 132 locks the operator out until receiving an acknowledgement that the operator and/or management has intervened to check the condition of the responsible cutting tool before further in-process operations of the CNC lathe 100 can continue.

In some embodiments the processor 132 maintains a tool manager database that tracks the number of times one or more of the tools has been used in the manufacturing operation. The usage can be compared to a predetermined threshold, such as can be a manufacturer's recommendation or can be empirically derived information. For example, the processor 132 can prompt the operator to regularly input whether one or more tools have been changed. From this data the processor 132 can calculate an expected tool life, and alert the operator when the actual usage approaches that calculated expected tool life. This can advantageously be used to predictively anticipate the need to change a tool before a catastrophic failure is likely to occur.

If the determination of block 230 is "no," then in block 234 the processor 132 performs a secondary machining operation, modifying the programmed tool path to add another tool pass at a dimension that is determined to achieve Conformance in view of the measurement obtained in block 220 and the Specified Tolerance as it is rooted in $NOM_{ADJ}$. The processor 132 then loops control back to block 220 to measure the workpiece 112a after the secondary machining, proceeding as described herein. Typically, the programmed tool path can include a tool deflection offset value for the secondary manufacturing operations.

Figures 15, 16:
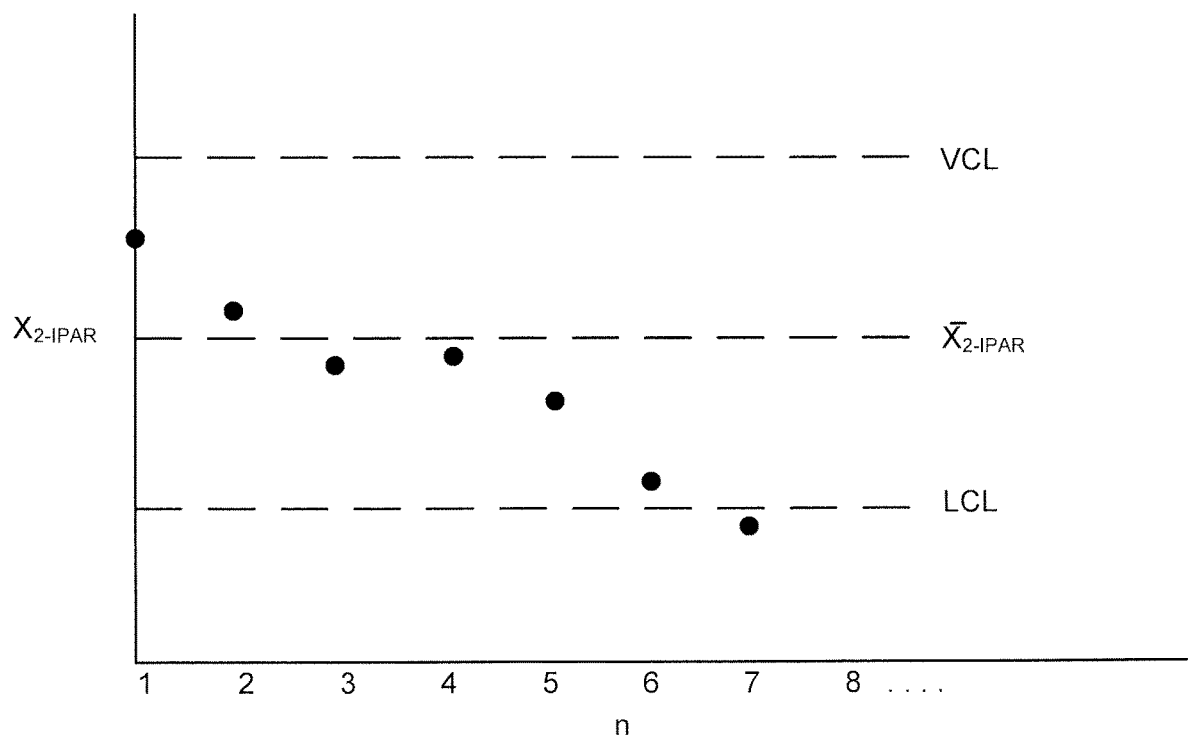
FIG. 15 depicts a stored memory array in the CNC lathe of FIG. 1.
FIG. 16 depicts in-process statistical process control charting of the data in FIG. 15 that is performed by the CNC lathe of FIG. 1.

The importance of effective data management in this technology will be appreciated from this description. FIG. 15 illustrates how some of the initial-calibration values, such as $X_1$, $X_2$, etc., can be stored in the memory 134 as a header in an indexable data array. The present PROFILE can also be stored in the array, or elsewhere. The IPAR values for each workpiece $112_n$, such as $X_{1\text{-}IPAR}$, are used in conjunction with the in-calibration values in the ongoing IPAR operations 119. That only changes when, by whichever of the multiple opportunities described herein, the processor 132 ceases in-process operations and performs the initial-calibration operation 115 again to replace the previously stored initial-calibration values with the newly computed initial-calibration values. The IPAR operations 119 then proceed by comparing new IPAR values with the replacement initial-calibration values.

However, the processor 132 can perform a deeper level of PQC by tracking the cycle-to-cycle variation for any or all of the IPAR values. For example, FIG. 16 depicts the processor 132 maintaining a statistical control chart of the sequential values of $X_{2\text{-}IPAR}$ from workpiece $112_1$ to workpiece $112_7$. The data suggests special (non-random) variation both in terms of generally trending downward and the latest data point exceeding the calculated control limits defining the range of expected variation. Even if the control limits are tighter than the Specified Tolerance, the processor 132 can advantageously leverage these sequential IPAR values to perform preventive actions, such as alarming the operator or even ceasing in-process operations until the initial-calibration operation 115 is performed again.

All the illustrative embodiments herein are just that, not limiting in any way. For example, in alternative embodiments the IPAR operations could probe the known object and calculate the axis of rotation. The initial-calibration would thereby calibrate the probe to the calculated axis of rotation in a similar way as described herein, and then the IPAR operations could recalibrate the instantaneous size and location of the KF to the axis of rotation, and compensate the tool cutting path for the position error introduced into the manufacturing operation.

Figure 17:
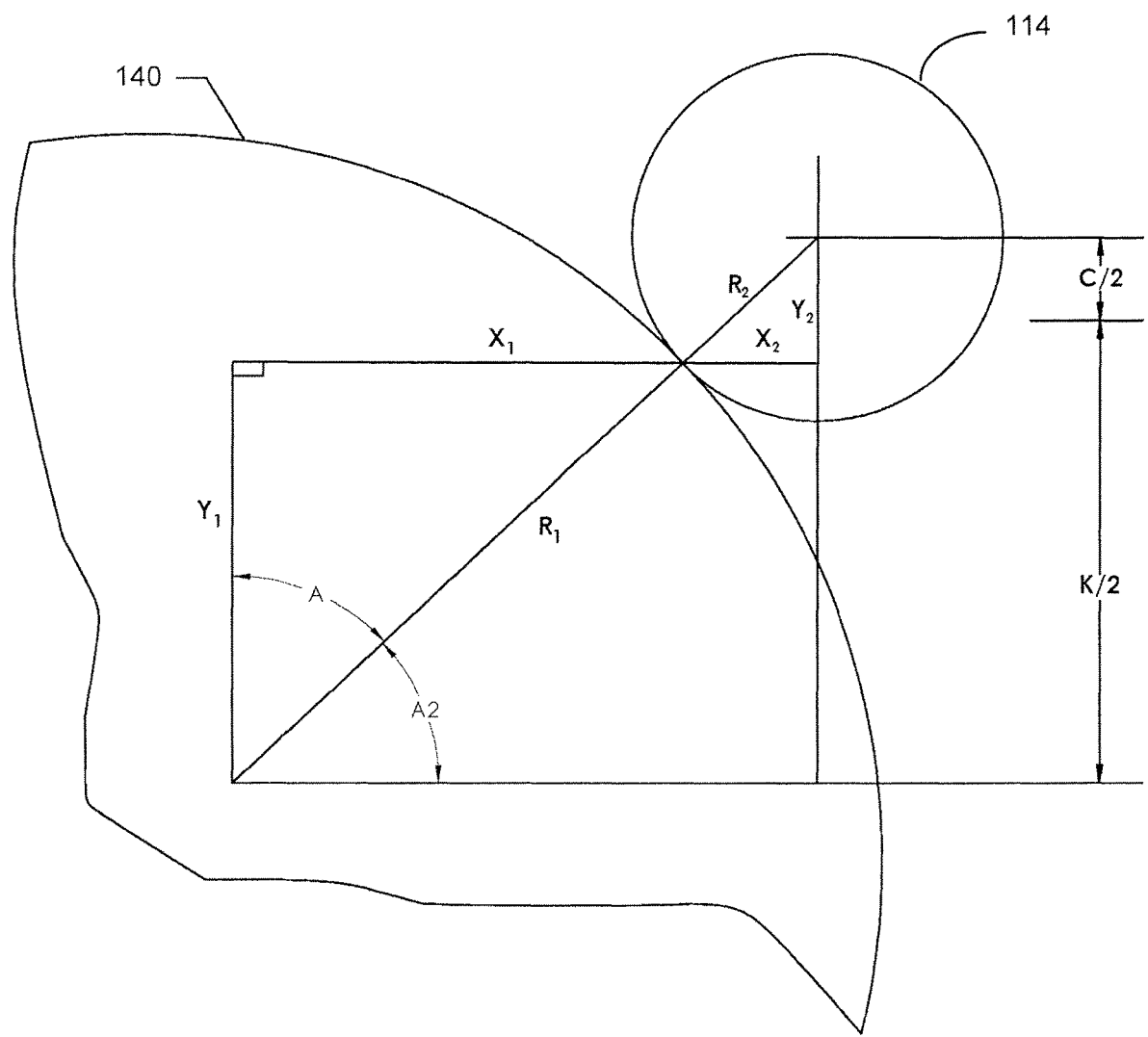
FIG. 17 diagrammatically depicts the CNC lathe of FIG. 1 performing IPAR operations in accordance with alternative embodiments of this technology.

In other alternative embodiments the position error can be measured in terms of tracking variation in the lathe center angle. FIG. 17 depicts the probe 114 indicating an arcuate surface of known diameter on the KF 140. The probe 114 can locate that surface at two points, at each of points above and below the horizontal axis and in vertical alignment with each other; only one of those two probed points is depicted in FIG. 17. The processor 132 calculates the lathe center angle A for the known fixture 140 in terms of the following equation:

$$A = 90 - \text{ArcSin}\left(\frac{\sin 90}{R_1 + R_2}\right) * \left(\frac{b, d}{2} + \frac{K}{2}\right)$$

where b,d is the compensation for backlash and coordinate drift as described above, and K is the vertical distance between the two probed points of the known fixture.

The lathe center angle for the known fixture 140 is instantaneously the same as the lathe center angle for the workpiece. The IPAR compensation value for position error, depicted as C, can be calculated in terms of the following equation:

$$C = (R_1 + R_2) - (Y_1 + Y_2)$$

In sum, although the source of some process variables are beyond control, this technology comprehensively and continuously measures and compensates for whatever variation is affecting the accuracy of a probe in a CNC lathe. This technology makes possible what has been out of reach by traditional techniques and calculations. By referencing a known fixture and measuring displacement at the time the workpiece is being inspected, it is possible to position-error-compensate to achieve a significantly higher process capability on an existing machine by employing this technology. The technology is a differentiator in that it enables an owner to run complex workpieces with relatively unskilled operators, making it possible to leave the quality control entirely to that which is built into the process—the IPAR operations. Furthermore, the expansive data collection and processing truly permits the empirical learning of the single best way to manufacture a workpiece, the archetype by which all other processes without IPAR are inferior.

The contemplated embodiments of this technology are not limited to the probe as disclosed for obtaining the in-calibration and IPAR values. In alternative embodiments multiple probes can be used, such as one each in the x-axis and z-axis direction. Alternatively, a probe with multiple styluses along the same or different coordinate axis directions can be used. Further, the KF can be provided with an additional surface that permits a determination of z-axis backlash and coordinate drift in the same manner as is described for the x-axis herein. Preferably, where two or more probes are used or where a probe with multiple styluses is used, the KF and the IPAR operations can be configured so that the distance between two probes or styluses can be initially-calibrated and automatically recalibrated during in-process operations in the same manner as described in the IPAR operations herein.

The contemplated embodiments of this technology are also not limited to the probe measurement device in the disclosed illustrative embodiments for obtaining the in-calibration values and the IPAR values. In alternative embodiments more sophisticated measurement devices are contemplated, such as the use of interferometry measurement equipment that can measure all the values instantaneously and continuously, improving the rate with which the data could be obtained in comparison to using a probe.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, other known fixture configurations and placements than those described are contemplated while still maintaining substantially the same functionality without departing from the scope and spirit of the claimed invention. Further, although the illustrative embodiments described herein are directed to PQC operations for a CNC lathe, and related technology, it will be appreciated by those skilled in the art that the claimed invention can be applied to other devices employing position control during a process as well without departing from the spirit and scope of the present invention.

What is claimed is:

1. A method of using a lathe, comprising:
   while the lathe is in a first configuration, initially calibrating a measurement probe installed in a tool holder of the lathe to a standard of known dimensions;
   while the lathe remains in the first configuration, using the initially-calibrated measurement probe to take one or more initial positional measurements of a non-rotating fixture carried by the lathe;
   storing the initial positional measurement values in a memory;
   after obtaining the initial positional measurement values, using the lathe to manufacture a plurality of workpieces; and
   while manufacture of the plurality of workpieces is in progress, using the probe to obtain a first set of subsequent positional measurements of the same fixture, without recalibrating the probe to the standard of known dimensions;
   storing the first set of subsequent positional measurement values in a digital memory;
   while manufacture of the plurality of workpieces is in progress, repeating the step of using the probe to obtain a second set of subsequent positional measurements of the same fixture without recalibrating the probe to the standard of known dimensions;
   storing the second set of subsequent measurement values in a digital memory; and
   using the initial and subsequent positional measurement values to automatically adjust the lathe so as to compensate for any deviation from its initial configuration.

2. The method of claim 1, further comprising:
   after manufacturing a plurality of workpieces, using the probe to measure one or more features of one of the plurality of manufactured workpieces and obtain one or more measurement values.

3. The method of claim 1, further comprising:
   using the initial and subsequent positional measurement values to detect any trend in the positional measurements; and
   counteracting any decrease in workpiece quality threatened by the trend.

4. The method of claim 3 in which the counteracting step comprises ceasing manufacture of workpieces.

5. The method of claim 1 further comprising:
   determining an acceptable range of the deviation between the subsequent positional measurements and the first configuration; and
   using the initial and subsequent positional measurement values to determine the deviation from the initial configuration.

6. The method of claim 5 further comprising:
   while the deviation from the initial configuration remain within the acceptable range of deviation, calculating compensation so as to counteract any decrease in workpiece quality threatened by the deviation.

7. The method of claim 5 further comprising:
   ceasing manufacture of workpieces when the deviation from the initial configuration is no longer within the acceptable range.

8. The method of claim 2 further comprising:
   using the initial and subsequent positional measurement values to automatically adjust workpiece measurement values obtained using the probe to compensate for the deviation from the first configuration.

9. The method of claim 8 further comprising:
   using the adjusted workpiece measurement values to automatically adjust a tool path to compensate for the deviation from the first configuration.

10. A method of operating a lathe, comprising:
    calibrating a measurement probe installed in a tool holder of the lathe to a standard of known dimensions, the measurement probe comprising more than one stylus;
    thereafter, using more than one stylus of the measurement probe to obtain initial positional measurement values of a stationary fixture carried by the lathe using the initial positional measurement values to acquire an initial probe stylus configuration;
    storing the initial positional measurement values in a memory;
    thereafter, using the lathe to manufacture a plurality of workpieces;
    while the step of using the lathe to manufacture the plurality of workpieces is in progress, using more than one stylus of the measurement probe to obtain first subsequent positional measurement values of the stationary fixture, without recalibrating the measurement probe to the standard of known dimensions;
    storing the first subsequent positional measurement values in a digital memory;
    while the step of using the lathe to manufacture the plurality of workpieces is in progress, using more than one stylus of the measurement probe to obtain second subsequent positional measurements of the stationary fixture;
    storing the second subsequent positional measurement values in a digital memory; and
    comparing at least one of the first subsequent positional measurement values and second subsequent positional measurement values of the fixture to the initial positional measurement values to detect a deviation from the initial probe stylus configuration;

in which the measurement probe is not recalibrated between the step of obtaining the first subsequent positional measurements and the second subsequent positional measurements.

11. The method of claim 10, further comprising:

adjusting the more than one stylus to counteract deviation from the initial probe stylus configuration.

12. The method of claim 10, further comprising:

measuring a workpiece with the probe after detecting a deviation from the initial probe stylus configuration; and using the deviation from the initial configuration to adjust values obtained from measuring the workpiece.

13. The method of claim 10, further comprising: ceasing manufacture of workpieces in response to the detected deviation.

14. The method of claim 10, further comprising:

establishing an acceptable tolerance for workpiece measurements;

measuring a workpiece with the probe after detecting a deviation from the initial probe stylus configuration to determine measurement values; and adjusting a tool path in response to measurement values indicative of a workpiece outside of the acceptable tolerance.

15. The method of claim 14 further comprising:

after adjusting the tool path, automatically performing additional machining to the out-of-tolerance workpiece using the adjusted tool path.

16. The method of claim 14 further comprising:

ceasing manufacture of workpieces in response to measurement values indicative of a workpiece outside the acceptable tolerance.

* * * * *